3,495,169
MODIFIED KELVIN BRIDGE WITH YOKE CIRCUIT RESISTANCE FOR RESIDUAL RESISTANCE COMPENSATION
Wesley H. Shirk, Jr., Ambler, and Dennis H. Gallagher, Glenside, Pa., assignors to Leeds & Northrup Company, Philadelphia, Pa., a corporation of Pennsylvania
Filed Jan. 2, 1968, Ser. No. 695,110
Int. Cl. G01r 27/02
U.S. Cl. 324—62     3 Claims

ABSTRACT OF THE DISCLOSURE

Modified Kelvin bridge circuit having resistance introduced into yoke circuit for compensation of residual resistance of calibrated rheostat arm.

CROSS-REFERENCE TO RELATED APPLICATION

This application is related to concurrently filed application, Ser. No. 694,927, of Wesley H. Shirk, Jr., and Richard F. Pistoll.

BACKGROUND OF THE INVENTION

This invention relates to circuitry for precision measurements of resistance, particularly of four-terminal resistances.

The state of the art of precise resistance thermometry is set forth at length in a two-part article of Daneman and Mergner in the May and June, 1967 issues of Instrumentation Technology Magazine. The bibliography at the end of the article includes, under the heading of "Bridge Methods," a list of papers by recognized experts in this field.

The present invention is particularly concerned with simplification of the circuitry and operating techniques used in resistance-thermometry.

Instead of the Mueller and Smith circuits heretofore commonly used in resistance thermometry, the basic circuit of the present invention is a modified Kelvin bridge in which resistance introduced into the yoke circuit effectively cancels out the residual resistance of the main rheostat arm. To that end, the yoke rheostat arm, in addition to the secondary rheostate arm, includes a resistance equal to a range-dependent ratio arm; the yoke-ratio arm is of resistance equal to the difference between the resistances of the battery-ratio arm and the range-dependent ratio-arm; and the resistance of the battery-ratio arm is greater than the resistance of the range-dependent ratio-arm by the term $10^n$, where $n$ is an integer greater than 1.

The invention further resides in a measuring bridge circuit having features of construction, combination and arrangement hereinafter described and claimed.

BRIEF DESCRIPTION OF DRAWINGS

For a more detailed understanding of the invention, reference is made to the following description of preferred embodiments thereof and to the accompanying drawings in which.

Figure 1:
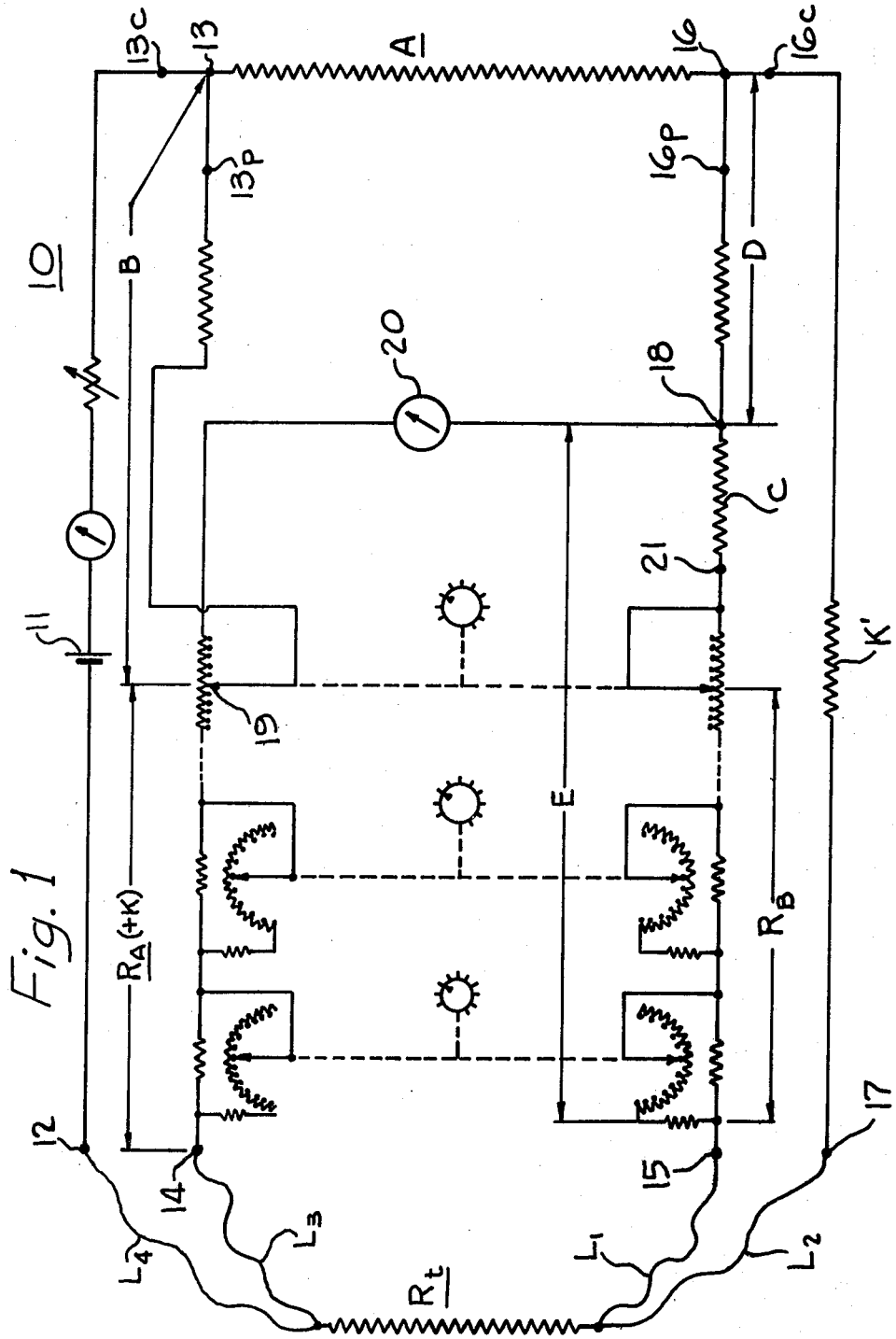
FIG. 1 is a schematic of the basic circuitry of the modified Kelvin bridge.

In the basic bridge circuit 10, shown in FIG. 1, the four-terminal resistance $R_t$ to be measured is connected by leads $L_1$, $L_2$, $L_3$, $L_4$ to terminals 15, 17; 14 and 12 of the bridge. The resistance $R_t$ may, for example, be a resistance thermometer whose changes in resistance are to be determined with an accuracy of ±1 p.p.m. (parts per million) or better. In double-bridge terminology, terminals 12 and 17 are current terminals and terminals 14 and 15 are potential terminals.

A source of current exemplified by battery 11 is connected between bridge terminal 12 and the upper end or terminal of resistance means A. This resistance is in a ratio arm of the bridge and is of preset or preselected precise value dependent upon the measurement range.

The adjustable calibrated resistance $R_A$, forming the main rheostat arm of the bridge, and the fixed resistance B, forming another ratio arm of the bridge, are connected in series between bridge terminal 14 and terminal 13 of resistance A. Preferably, and as shown, the adjustable resistance $R_A$ comprises a series of decade resistors whose incremental steps differ by powers of 10 and at least some of the lower order decades being of the shunted type. For example, for readout of $R_A$ to seven significant figures, resistance $R_A$ may include seven decade resistors respectively providing ten steps of 0.001, 0.01, 0.1, 1, 10, 100 ohms each and 15 steps of 1000 ohms to afford a range of $R_A$ from 0 to 16,111.11 in steps of 0.001 ohm. The fixed resistance B may be a precision resistor or resistance network. By way of example for use with the decade resistor values previously mentioned, the ratio arm B may have a resistance of 10,000 ohms so to provide, with ratio arm A having a resistance of 100 ohms, a measuring range from 0 to 161.1111. For a ratio arm A having a resistance of 1000 ohms, the preceding values of $R_A$ and B provide a measuring range of 0 to 1611.111. In other words with arm A of 1000 ohms, the bridge multiplier is $\times 10^{-1}$; and with arm A having a resistance of 100 ohms, the bridge multiplier is $\times 10^{-2}$.

The yoke-rheostat arm E between terminals 15, 18 of bridge 10 comprises the secondary rheostat arm $R_B$ and the fixed resistance C. Preferably, and as shown, the resistance $R_B$ is also a series of decade resistors respectively corresponding with a like decade resistor of the main rheostat arm $R_A$. For convenience and as schematically shown in FIG. 1, the adjusting means of corresponding pairs of decades are ganged for concurrent adjustment of $R_A$ and $R_B$ to the same effective or in-circuit value. For any given range of measurement, the value of fixed resistance means C is equal to that of the ratio arm A within close limits, say ±0.001%. The yoke-ratio arm D is connected in series with the yoke-rheostat arm E between bridge terminal 15 and terminal 16 of ratio arm A. The resistance means D, for any given range of measurement, is of fixed value equal, within close tolerances of say ±0.0005%, to that of resistance means B minus that of resistance means A (i.e., $D=B-A$). The yoke compensating resistance K' connected between bridge terminal 17 and terminal 16 of resistor A is of value equal to the residual resistance K of the main rheostat arm $R_A$ of the bridge. The proper value of resistor K' for any given concurrent values of resistance means A, B, C and D may be determined by directly shorting the bridge terminals 12, 14, 15 and 17 with a heavy copper bar, for example, whose resistance is less than the least step of the range, then setting the resistance means $R_A$ and $R_B$ to indicated 0 values thereof, and then selecting or adjusting the value of K' for which there is a null indication of the detector 20.

Although schematically shown simply as a galvanometer, the detector 20 preferably includes a high-gain electronic amplifier of known suitable type. Detector 20 is connected between potential points 18, 19 of the bridge. The point 18 is a junction point of the yoke-rheostat arm E and the yoke-ratio arm D: the point 19 is the junction point of the main rheostat arm $R_A$ and the ratio resistance B. Preferably and as shown, the point 19 is the junction of two adjacent resistors in the last decade of arm $R_A$, and is variable dependent upon switch position. At balance of the bridge, the current to the detector 20 through that part of the last decade excluded from arm $R_A$ is essentially zero so that inclusion of any part of the last decade of arm $R_A$ in the detector branch of the bridge has no effect upon bridge balance.

The equation for balance of bridge 10, using notations above discussed, may be written as:

$$R_t = R_A \frac{A}{B} + \frac{A}{B}\left[K + L_3 - \frac{(L_2+K')(E+D)}{E+D+L_1+L_2+K'}\right]$$
$$+ \left[\frac{L_2+K'}{E+D+L_1+L_2+K'}\right]\left[\frac{D}{B}L_3 - L_1\right]$$
$$+ \left[\frac{(L_2+K')(1-A/B)}{E+D+L_1+L_2+K'}\right][E(\epsilon - \delta)] \quad (1)$$

where $R_t$ = unknown four-terminal resistance
$L_1$, $L_2$, $L_3$, $L_4$ = lead resistances of $R_t$
$R_A$ = readout value of main rheostat arm and = $R_B$
$A$ = ratio arm [note $C = A$]
$B$ = ratio arm where $B > A$ and decimally related
$E$ = yoke-rheostat arm = $R_B + C$
$D$ = yoke-ratio arm = $B - A$
$K$ = residual in rheostat arm circuitry
$K'$ = compensating resistance in yoke circuitry
$\epsilon$ = deviation in proportional parts of E from $(R_A + A)$
$\delta$ = deviation in proportional parts of E from $(B - A)$ The second and subsequent terms of Equation 1 involving lead resistances become negligible if $(K+L_3)$ is made nominally equal to $(L_2+K')$.

The effect of actual mismatch of lead resistance upon $R_t$ as measured is reduced by the ratio $A/B$. Thus, for either the 1:10 or the 1:100 ratio previously mentioned, exceptional accuracy is readily achieved even though the lead resistances are not negligible with respect to the bridge ratio arms; also for these ranges, the need is significantly lessened for reversing the leads and then averaging the normal and reverse readings for two bridge balances. So that, for a 25 ohm ($R_0$=25 ohms) platinum resistance thermometer measured in the range where $A/B$ is 1:100, having leads $L_1$, $L_2$, $L_3$ of magnitude 1 ohm with $L_2$ and $L_3$ matched to 0.003 ohm and $L_1$ and $L_3$ matched to 0.01 ohm, a total error of 0.00003 ohm or 0.0003° C. is introduced for a measurement at the triple point of water. If absolutely necessary for ultimate precision, commutation of leads can be accomplished effectively by use of a silver-alloy rotary switch, eliminating the need for a mercury wetted type switch for this purpose.

Figure 2:
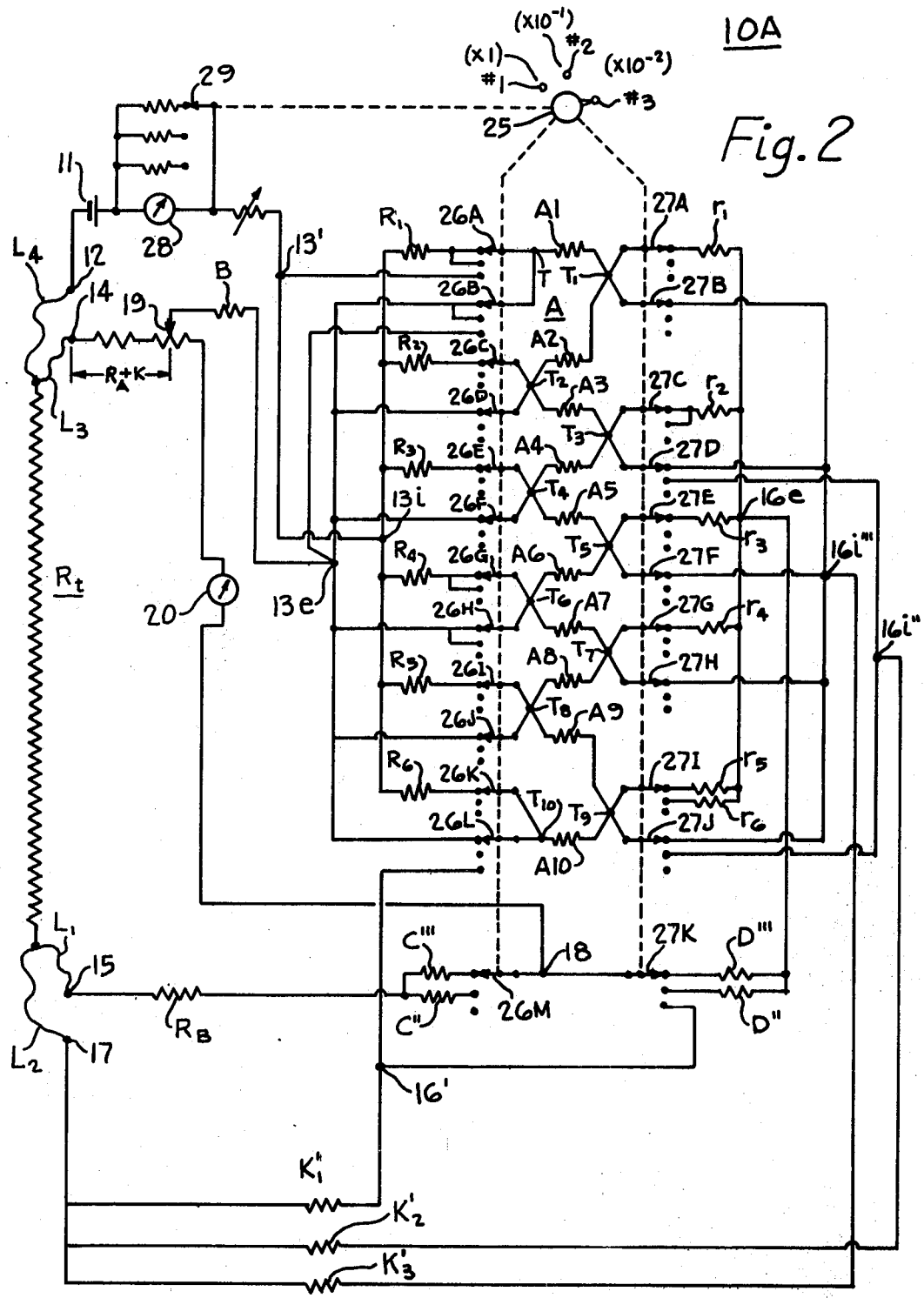
FIG. 2 is a simplified circuit diagram of a three-range bridge whose basic circuitry for two ranges is that of FIG. 1.

The multi-bridge 10A of FIG. 2 includes switching circuitry which, to attain different ranges of measurement, changes the $A/B$ ratio, the resistance values of the C, D and K' arms, and without need for recalibration of the bridge of each range.

Preferably, and as shown, the change in the $A/B$ ratio is obtained by using, for the A arm, 10 nominally equal-valued resistors A1 to A10 permanently connected in series between the two tie-points T and T10 by intermediate or common symmetrical junction tie-points T1 to T9. By way of example, each of these resistors may be 1,000 ohms, so to afford 10,000 ohms as the maximum value of A for the ×1 range of the bridge.

In the ×10⁻² position of range switch 25, all of the resistors A1 to A10 are connected in shunt by a method which eliminates interconnection resistance in the parallel-ing of A1 to A10, permitting current flow through resistances A1 to A10 in proportion to their resistance value only, thus making the ratio of the series to parallel connection and simultaneous range change accurate to 1 p.p.m. or less. Low resistance compensation means $r_1$ through $r_5$ and $R_1$ through $R_6$ are adjusted to within 0.1% of each other except for $R_1$ and $R_6$ which are adjusted to ±0.1% of twice the value of the others, in addition to the shorting branches leading to tie-points 13e and 16i''' are necessary requirements for the paralleling method.

Effectively, then, due to these means, each junction on either side of range switch 25, as shown in FIG. 2, is at the same potential. Tie-points 13e, 16i''' and 13i, 16e are the terminal points for each group of shorting branches and compensation branches, respectively. Since there is no definite common point existent at the opposite end of these branches, the junction points for the four terminal resistance A are virtual. The four-terminal ratio arm A is 100 ohms for this position of range switch 25.

The effective lead resistance resulting from the compensation or shorting branches that is in series with high resistance ratio arm B, yoke ratio arm D and low resistance yoke-compensating resistance K' is either negligible or incorporated in the adjustment of the affected bridge resistor. Specifically, for the ×10⁻² range (No. 3 position of range switch 25): (a) its movable contacts 26B, 26D, 26F, 26H, 26J and 26L engage their No. 3 fixed contacts to connect all of symmetrical junction tie-points T, T2, T4, T6, T8 and T10 by equi-length low resistance leads to common tie-point 13e in series with the B ratio arm; (b) its movable contacts 27B, 27D, 27F, 27H and 27J engage their associated No. 3 fixed contacts to connect all of symmetrical junction tie-points T1, T3, T5, T7 and T9 by equi-length low resistance leads to point 16i''' of compensating resistor arm K₃'; (c) its movable contacts 26A, 26C, 26E, 26G, 26I, 26K respectively connect the symmetrical junction tie-points T, T2, T4, T6, T8, T10 to the point 13i of the battery arm, each through an associated compensating resistor $R_1$ to $R_6$; (d) its movable contacts 27A, 27C, 27E, 27G, 27I respectively connect the symmetrical junction tie-points T1, T3, T5, T7, T9 of the resistor network to the common tie-point 16e—each through an associated compensating resistor $r_1$ to $r_5$; (e) its movable contact 27K connects resistor D''' between tie-point 16e and bridgepoint 18; (f) and its movable contact 26M connects resistor C''' between bridge points 18 and 15 in series with the calibrated rheostat arm $R_B$. For the ×10⁻² range, the proper values of C''' and D''' are respectively 100 and 9,900 ohms. The basic circuitry for this measurement range of bridge 10A is the same as shown in FIGURE 1.

In the ×10⁻¹ position of range switch 25, the resistors A1 to A9 are connected so as to form three parallel groups, each consisting of the three series-connected resistors, by a method described above for the ×10⁻² position of the range switch. The resistor A10, not connected in this particular range, is adjusted to the average value of the A1 through A9 resistors within a few p.p.m. so as not to affect the transition to the series-parallel arrangement of arm A for the ×10⁻¹ position by more than a few tenths of a p.p.m.

Specifically, for the ×10⁻¹ range (No. 2 position of range switch 25): (a) its movable contacts 26B, 26H engage their No. 2 fixed contact to connect symmetrical tie-points T and T6 by equi-length leads to common tie-point 13e; (b) its movable contacts 26A and 26G engage their No. 2 fixed contact to connect symmetrical tie-points T and T6 to common tie-point 13i through associated compensating resistors $R_1$ and $R_4$; (c) its movable contacts 27D and 27J respectively connect symmetrical tie-points T3 and T9 by equi-length to common tie-point 16i'''; and (d) its movable contacts 27C and 27I respectively connect symmetrical tie-points T3 and T9 to common tie-point 16e through compensating resistors $r_2$ and $r_6$. Therefore, for this range, the A arm consists of the parallel combination of A1, A2, A3; A4, A5, A6; and A7, A8, A9 each group of which is connected in series, to yield a resistance value of 1000 ohms. For this No. 2 position of the range switch, its contacts 26M and 27K include resistors C'' and D'' in the bridge arms A and D of the basic circuitry of FIG. 1. For this ×10⁻¹ range, the proper values of C'' and D'' are 1,000 and 9,000 ohms to suit the requirements of Equation 1 for the specific example under discussion. The basic circuitry of bridge 2A for this range is the same as shown in FIG. 1.

For the ×1 position of the range switch 25, the bridge 10A becomes a modified form of Wheatstone or Mueller bridge rather than a modified form of Kelvin bridge. A different balance equation now applies—specifically:

$$R_t = R_A + (K - K') + (L_3 - L_2) \qquad (2)$$

where $R_t$ = unknown four-terminal resistance
$L_1, L_2, L_3, L_4$ = indicated lead resistances of $R_t$
$R_A$ = readout value of main rheostat arm = $R_B$
A = ratio arm = B
K = residual resistance of $R_A$
K' = compensating resistance = K Measurement error, due to the second term of Equation 2 above, is made negligible by prematching of resistance K' to equal the residual resistance K of bridge arm $R_A$. To negate the lead error for this bridge configuration in the measurement of low resistance, it is necessary to reverse the lead connections of $R_t$ and average the balance readings obtained with the normal and reverse connections. However, most low resistance measurements can be carried out on the lower two ranges whose lead reversal and two balancing operations are not necessary.

For the ×1 position of range switch 25, the engagement of its movable contacts 26A, 26L with their No. 1 fixed contacts connects all of resistors A1–A10 in series between the symmetrical tie-point 8 and point 16'; engagement of movable contact 27K of the range switch with its No. 2 fixed contact connects point 18 of the detector circuit with the aforesaid junction point 16' of bridge arms A and K'.

The current supplied by source 11 to resistance thermometer $R_T$, or other unknown, may be continuously monitored by milliammeter 28. The movable switch contact 29 for selection of range shunts for meter 28 are ganged to the range switch 25 of bridge 10A.

The particular embodiment of the invention shown in FIG. 2 hereof is specifically claimed in concurrently-filed application, Ser. No. 694,927, by Wesley H. Shirk, Jr., and Richard F. Pistoll.

What is claimed is:

1. A modified Kelvin bridge having a range-dependent ratio-arm (A), a battery ratio-arm (B), a main-rheostat arm ($R_A$), a yoke-rheostat arm (E), a yoke-ratio arm (D), and a yoke circuit characterized in that
    the yoke circuit includes added resistance means (K') matching the finite residual resistance of the main-rheostat arm ($R_A$),
    the yoke-rheostat arm (E) in addition to a secondary-rheostat arm ($R_B$) includes resistance means (C) equal in resistance to the range-dependent ratio-arm (A), and
    the yoke-ratio arm (D) is of resistance equal to the difference between the resistances of the battery ratio-arm (B) and the aforesaid range-dependent ratio-arm (A), the resistance of the battery ratio-arm being greater than the resistance of the range-dependent ratio-arm by the term $10^n$ where $n$ is an integer greater than 1.

2. A modified Kelvin bridge as in claim 1, in which
    the main-rheostat arm at least in part comprises shunted decades to minimize error at low value due to contact resistance but inherently having substantial residual resistance at "zero" setting, and
    in which the added resistance means (K') is of value equal to said residual resistance of the shunted decades for compensation thereof when the bridge is balanced.

3. A modified Kelvin bridge as in claim 1, in which the unknown resistance to be measured is a resistance thermometer calibrated at a given current value, and
    which includes a meter traversed by the total current of the bridge and shunted by a compensating resistance for direct reading of the current traversing and resistance thermometer.

References Cited

UNITED STATES PATENTS 3,307,104    2/1967    Shirk _____ 324—62

OTHER REFERENCES

Daneman, H. L. and G. C. Mergner: "Precise Resistance Thermometry—A Review," In Instrumentation Technology, May-June, 1967, pp. 51–56, 68, 69.

Hamon, B. V.: "A 1–100Ω Buildup Resistor for the Calibration of Standard Resistors," In Journal of Science Instruments, vol. 31, pp. 450–452, 1954.

Harris, F. K.: "Electrical Measurements," New York, John Wiley & Sons, Inc., 1952, pp. 282–289.

EDWARD E. KUBASIEWICZ, Primary Examiner

J. M. HANLEY, Assistant Examiner

PO-1050
(5/69)

UNITED STATES PATENT OFFICE
CERTIFICATE OF CORRECTION

Patent No. 3,495,169      Dated February 10, 1970

Inventor(s) WESLEY H. SHIRK, JR. and DENNIS H. GALLAGHER

It is certified that error appears in the above-identified patent and that said Letters Patent are hereby corrected as shown below:

Column 3, line 27, change "E" to -- D --.

Column 5, line 27, change "8" to -- T --.

SIGNED AND SEALED

JUL 7 1970

(SEAL)
Attest:

Edward M. Fletcher, Jr.
Attesting Officer

WILLIAM E. SCHUYLER, JR.
Commissioner of Patents